United States Patent
Nave et al.

(10) Patent No.: US 7,324,810 B2
(45) Date of Patent: Jan. 29, 2008

(54) CELLULAR BROADCASTING MEDIA

(76) Inventors: Zvika Nave, 24 Carmel st., Alfei Menashe 44851 (IL); Ziv Nave, 24 Carmel st., Alfei Menashe 44851 (IL)

(*) Notice: Subject to any disclaimer, the term of this patent is extended or adjusted under 35 U.S.C. 154(b) by 913 days.

(21) Appl. No.: 10/131,226

(22) Filed: Apr. 25, 2002

(65) Prior Publication Data

US 2002/0160762 A1    Oct. 31, 2002

Related U.S. Application Data

(60) Provisional application No. 60/286,667, filed on Apr. 27, 2001.

(51) Int. Cl.
*H04Q 7/22* (2006.01)

(52) U.S. Cl. .................................. 455/414.1; 455/500
(58) Field of Classification Search ............... 455/414, 455/414.1, 500, 3.02, 3.04
See application file for complete search history.

(56) References Cited

U.S. PATENT DOCUMENTS

| 2004/0202290 | A1* | 10/2004 | Zellner et al. ................ 379/45 |
| 2005/0277424 | A1* | 12/2005 | McKenna et al. ........... 455/450 |
| 2006/0022048 | A1* | 2/2006 | Johnson .................. 235/462.1 |

* cited by examiner

*Primary Examiner*—Duc M. Nguyen
*Assistant Examiner*—Chuck Huynh
(74) *Attorney, Agent, or Firm*—Mark M. Friedman

(57) ABSTRACT

A system and method for providing a new commercial data broadcasting media (CBM) that uses the intrinsic RF relay mechanism of the existing cellular phone network infrastructure to broadcast data to consumer masses. The system can be used to enable broadcasting of data to a large number of subscribers in specific geographical areas who are equipped with electronic devices that receive the data from the cellular base station transmitter and display it. Subscribers are provided with End User Terminals (EUT) that are characterized by identical phone numbers and service provider details. These EUTs can follow the handshake procedure between a cellular base station and a Cellular Stimulator (CS) unit that belongs to the CBM, such that following a handshake procedure between the CS and a cellular base station, all the EUT units that are in the proximity of the base station receive any data that is transmitted from the base station to the CS.

15 Claims, 1 Drawing Sheet

CELLULAR BROADCASTING MEDIA

CROSS REFERENCE TO RELATED APPLICATIONS

This application claims the benefit of provisional patent application Ser. No. 60/286,667 filed Apr. 27, 2001.

FIELD AND BACKGROUND OF THE INVENTION

1. Field of the Invention

The present invention relates to data broadcasting system and method, and in particular to a new commercial data broadcasting media utilizing the cellular telephone infrastructure.

2. Description of the Related Art

Commercial advertising has traditionally utilized the advantages of broadcast media to deliver messages to masses of receivers. The most common means of commercial advertising today are TV, Radio, Billboards, newspapers and the Internet. These means typically feature the transmitting of data to potential customers, using the above-mentioned mediums. The value that corporations are prepared to pay for advertisements typically depends on the effectiveness and reach of the advertisements. Any medium that can guarantee reaching a target market is thereby estimated as having commercial value.

During the last decade, cellular telephones have revolutionized global communications, by providing hundreds of millions of users with devices that are able to send and receive audio and/or textual and/or graphic data, from anywhere and at any time. Cellular networks are telecommunications systems in which a portable or mobile radio transmitters and receivers (cellular telephones or "cell phones") are linked via radio frequencies to base transmitters and receiver stations, which connect the users to wireline (conventional) telephone networks. The geographic region served by a cellular system is subdivided into areas called cells. Each cell typically has a central base station, which is in fact a high power radio transmitter combined with a multi-channel receiver. These base stations can typically transmit data over several frequencies, and in different codes, and also receive a number of cellular transmissions over the same frequency, and analyze the data, using sophisticated algorithms such as CDMA, which enables multiple accesses of subscribers by means of code division (Code Division Multiple Access), or TDMA, which enables multiple accesses of subscribers by means of time division (Time Division Multiple Access). These base stations typically receive data from individual cellular telephones over radio frequency (RF) waves, and distribute data to the subscribers in the surrounding area. Even though this data is in principle available to all RF receivers in the proximity of the base station transmitter, only the particular phone device that was targeted (dialed) by an initiated phone call can actually process the data, because it is given a 'key' to break the coding of the data at the beginning of the call (during the 'handshake' process, that is discussed below). It is important to understand that all cell phones have special identification codes associated with them, which are used to identify each particular cellular phone unit, the phone's owner and the service provider. A cell phone can typically only be accessed if a call initiator knows all these details.

When a call is placed to a cellular phone, the base station transmits some call initialization data and waits for the cellular unit to respond. The cellular network can choose to either have all the base stations transmit simultaneously and 'look for' the cellular phone that the call was made to, or 'remember' where the cell phone was last used and try to locate it in that proximity (transmit over a single or limited number of base stations). In either case, when the cell phone has been located (a base station receives the cell phone response), only the base station which receives the cell phone response continues transmitting, while all the other base stations no longer transmit to this user. In some recent networks, such as the CDMA network in Israel, an algorithm exists in which two or three base stations in the proximity of the cell phone all transmit at once, so that even if the phone is moving, it will always be able to receive transmissions from at least one base station, and therefore the call will not be interrupted or disconnected when moving between cells. This function is known as "roaming", and is one of the key features of the cellular network. Cellular networks typically consist of dozens, and sometimes hundreds of base stations, of which only two or three are typically in use when contacting a particular user.

One other important fact about the cellular network is that when a call to a cellular phone is first initiated, the base station and the cellular phone unit run a so-called 'hand shake' procedure, in which they decide on what frequency to operate on, what parameters to use when coding and decoding the messages (the 'key' that was mentioned earlier), and also information about the cell unit (as there can be multiple types of cell phones on the same network). After the initial 'handshake', the base station can transmit whatever data is received from the network to the cell phone, and can receive data transmitted from the cell phone to the network.

Recently, with the expansion in SMS messaging, cellular telephone companies have begun commercial advertising campaigns aimed to alert their subscriber's as to special offers or alternative announcements. For example, cellular service providers can currently send SMS messages to subscribers notifying them of a new special offers. These messages are typically sent to subscribers by sending each subscriber a message by SMS. Modem cell phones can also navigate the Internet and download data in HTML or WAP formats. This is typically executed in a similar way to a regular, wireline phone call to an internet service provider (like when using a home PC), only here the cellular phone acts as the interface between the user and the internet, much like the PC does at home.

Typical cellular networks profit in providing these and other cellular services to their subscribers, demanding payment for network time (air time). All known services, such as cellular phone calls, WAP navigation and SMS messaging are conducted between individual users and the cellular network. There are no known applications or technologies that utilize the cellular infrastructure to provide data broadcasts to subscribers.

There is thus a widely recognized need for, and it would be highly advantageous to have, a method and system that can enable broadcasting various types of data to a large number of people who are equipped with mobile communications devices, using the existing cellular infrastructure. Such a system should also ideally offer a new way of broadcasting commercial and other data to consumers and/or subscribers, at any location and at any time, using a variety of communication and computing devices.

SUMMARY OF THE INVENTION

According to the present invention there is provided a new commercial data broadcasting media (hereinafter referred to as "CBM"). The CBM uses the intrinsic RF relay mechanism of the cellular phone infrastructure to relay broadcasting of data to a large number of people, hereinafter referred to as "subscribers", in particular geographical areas. Each subscriber is equipped with specially designed electronic devices that not only receive the data from the cellular base station transmitter and display it, but also carry other useful functionalities for the well being of the user.

The CBM, in addition to requiring the existing cellular infrastructure (such as CDMA, TDMA, GSM, Analog as well as future mobile communication infrastructures such as all 3G standards supporting cellular networks), contains three major components:

1. End user terminals (EUT) specially designed to receive, process and project commercial or other data.
2. CS (Cell Stimulator) units, which are in fact commercial cellular phones (optionally provided with simple control units), which are subscribed to a cellular service vendor, and are controlled remotely by the Central Control Unit.
3. The CCU is the Central Control Unit of the CBM. It remotely controls the operation of the CS units, and manages the CBM.

A preferred embodiment of the present invention is executed in the following way: At least one Cellular Stimulation (CS) unit is placed in the vicinity of at least one cellular base station, following which a Central Control Unit (CCU) calls the CS. A handshake procedure is executed between the CS and the cellular base station, such that at least one End User Terminal (EUT) follows, but does not interact with, the handshake procedure. Data is then transmitted to the CS from the CCU, via the cellular network (i.e. the base station), and the same data is simultaneously received by the EUT unit(s) in the vicinity (that followed the handshake). In the case where there are a plurality of CS units, the CS units are equipped with control units, by means of which the CCU can operate or shut down the various units, essentially leaving one unit operable at any one time. In this way the CCU can transfer data to that operable unit only, and thereby communicate data to all EUTs in the proximity of the cellular base station(s) that communicates with that particular CS.

In an additional embodiment of the present invention, a method if provided wherein data is broadcast to a plurality of mobile communication device subscribers, according to each subscriber's device type.

An additional embodiment of the present invention provides a method whereby data is broadcast to a plurality of mobile communication device subscribers, according to each subscriber's user type.

A further embodiment of the present invention enables the real time transmitting (broadcasting) of product data to product display devices (EUTs).

Another embodiment of the present invention provides for operating a localized paging system, based on the cellular network.

BRIEF DESCRIPTION OF THE DRAWINGS

The invention is herein described, by way of example only, with reference to the accompanying drawing, wherein.

DESCRIPTION OF THE PREFERRED EMBODIMENT

Figure 1:
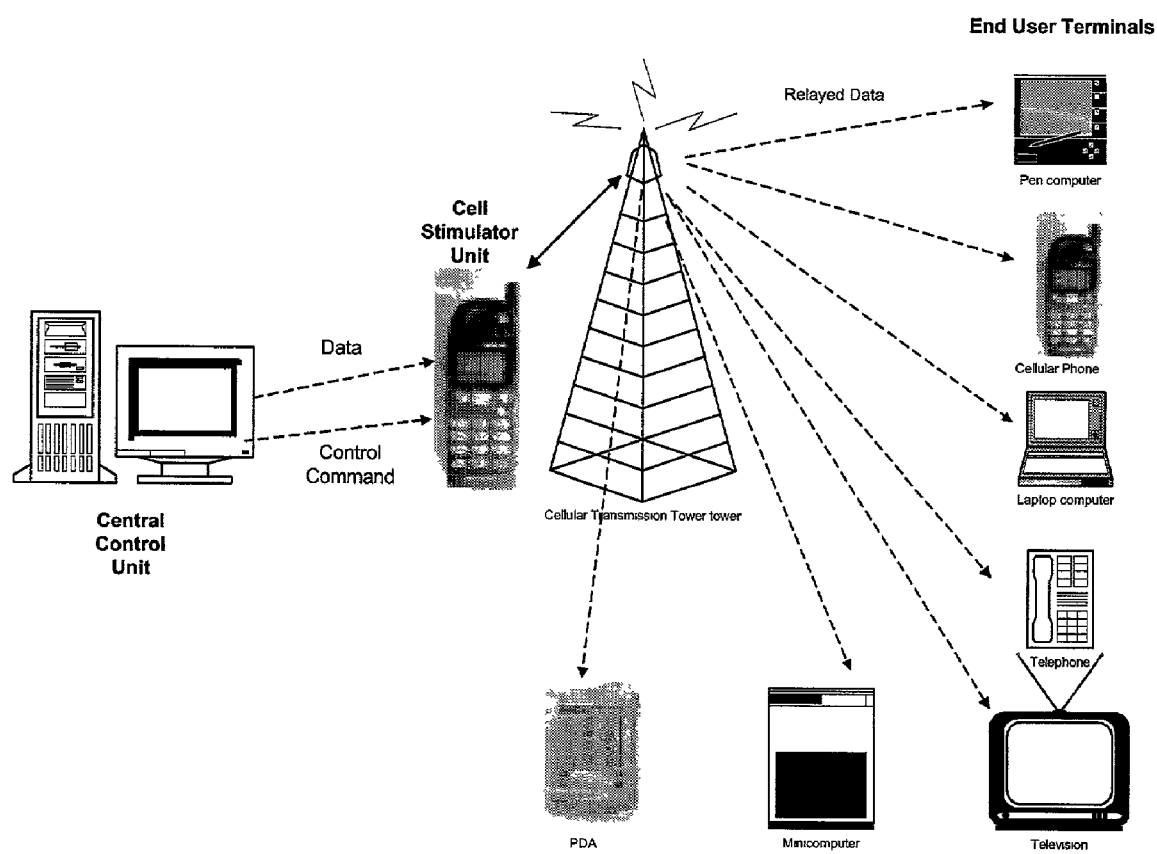
FIG. 1 is an illustration of the primary components of the CBM.

The present invention relates to a system and method for providing a new commercial data broadcasting media (hereinafter referred to as "CBM") that uses the intrinsic RF relay mechanism of the existing cellular phone network infrastructure to broadcast data to consumer masses.

The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Specifically, the present invention can be used to enable broadcasting of data to a large number of people in specific geographical areas. These people (subscribers) are equipped with specially designed electronic devices that receive the data from the cellular base station transmitter and display it. These devices typically enable other useful functionalities for the well being of the user, such as electronic diaries, electronic books, wearable computing devices, appliances etc. In addition, the system of the present invention offers a new way of reaching the individual at home, in the office, in a shop, hospital or in any other location, at all times.

The CBM, according to the present invention, provides for a new system and method that utilize the innate capabilities of the cellular communications infrastructure, and its natural transmission power of data, to enable mass broadcasting of content to users. Data is hereby broadcast to all users in a geographical proximity, by providing all these users (subscribers) with communication devices (hereinafter referred to as End User Terminals or "EUT") that are characterized by identical phone numbers and service provider details. These EUTs are furthermore preprogrammed to follow the handshake procedure between a cellular base station and a cell phone that belongs to the CBM system (referred to hereinafter as the Cell Stimulator or "CS"). These EUTs are all equipped with the same cell phone parameters such that when a handshake procedure is being made between the CS and a base station, all the EUT units that are in the proximity of the base station receive these signals and thereby 'know' what the CS is receiving and transmitting at all times. The EUT units do not interfere with the handshake procedure between the CS and the base station, as the EUT units are not equipped with transmitters. Therefore even though the EUT units receive the call initiation signals when the CCU calls the CS, the EUT units cannot send response signals, and so the network does not know that the EUT units are active or where they are located. The EUT units in a given cell (geographical area surrounding a base station) cannot typically receive the actual CS unit transmissions, because the CS is essentially a cellular phone that transmits at very low power, which only a base station in close proximity can receive. After the handshake procedure between the base station and the CS, however, any data that is transmitted from the base station to the CS can be received by all the EUT units in the proximity of the base station, which have 'listened' to the handshake and followed its procedure.

For example, take the scenario whereby user A purchases or is given a EUT and is issued the number 1234567. A plurality of similar EUT units are subsequently purchased by or given to other users, all these units being configured with the same number, as well as certain parameters shared by user A's EUT, such as it's serial number, and other parameters that belong to its data processing standard (such as CDMA, GSM, TDMA etc.). An additional cell phone type device, the CS, is programmed with an identical phone number and similar parameters (parameters may differ slightly in the cases where various device and/or user types are identified, as is described below). The CS is optionally configured with a control unit for enabling remote operation and shut down, and is placed in close proximity to a cellular transmitter station.

The CBM administrator must first, before communication with a chosen CS unit, switch off all the other CS units that are registered to this particular cellular network. This is done through calling the various units and sending a command to turn the units off, or by any other means of remotely disabling the devices. Alternatively, all the CS units are in off-mode by default, and do not require disabling. In this case, only the desired CS required a call or other means in order to enable (operate) the unit. The CBM administrator then makes a call to a chosen CS using the generic CS phone number (which is the same number for all CS units as well as all EUTs in the network, which, as mentioned before are devices with essentially the same parameters). After the call is made to the CS, a handshake procedure is initiated between the CS and a base station (normally the closest base station to the CS will be the one to receive the CS unit and transmit to it). Since user A's EUT along with the other EUTs in the proximity of the base station, can also receive the data that the base station is transmitting to the CS (since the base station is a powerful transmitter, and they are all in the proximity of that transmitter), and user A's EUT, along with all the other EUTs, have also received the same phone number as the CS (1234567), which is broadcast over the cellular network by the base station, the CS and the base station handshaking procedure is readily understood by all the other EUTs. All the EUTs can therefore receive whichever instructions and data the base station transmits to the CS, as they already 'know' what the CS answers to each 'question' from the base station transmitter (as they are already programmed with all the necessary parameters), thereby quietly following the handshake procedure.

At this stage the CBM administrator can transmit data (such as commercial data) to the CS, and since a plurality of EUTs have followed the handshake, they now receive all the data that is sent to the CS. Furthermore, because the EUTs are programmed with a common protocol, the EUTs 'understand' the data and display it on their screens. If there were more than one EUT in the proximity, they would all function the same, and therefore any number of EUTs in the proximity would all display the received content, without the CS, the base station or the cell phone service provider ever knowing that they were there.

In this way, the CBM administrator, who may initiate a call like any other cellular service subscriber, can direct a call to a mass of users. Such a call, which may be configured to broadcast text, graphic or audio data, can therefore be transmitted simultaneously (broadcast) to all the subscribers in the vicinity of a cellular base station (transmission tower).

An additional embodiment of the present invention is concerned with controlling the recipients of the data. As described earlier, placing a cell phone (the CS) in the vicinity of a base station enables the CBM administrator to 'broadcast' data to any EUT in the same vicinity. Accordingly, a number of cell phone units (cell stimulators (CS)), are given the same phone number and parameters. If they are all operated in separate areas at the same time, it may confuse the cell phone network, which is used to only one cell phone per number. If, however, only one CS is switched on at any particular time (using its control module), a call placed to that number would cause no network problems. Similarly, if the CS can be turned off, and a different CS turned on, the network would simply assume that the cell phone has moved to a different cell area, which is a normal, allowable action.

All that is required in order to broadcast data over a number of base stations, therefore, is to switch on a single CS unit each time, call the same number, send the data, hang up, turn that CS off, and start another similar cycle for the next CS unit. Thus, the CBM administrator can control the various base stations on an individual basis, by controlling the functioning of the individual Cellular Stimulator (CS) units. In order to control the CS units, the controller units in the various CSs are connected to the CBM central control center (optionally operated by a mainframe computer, and hereinafter referred to as the Central Control Unit or "CCU"), be it via Internet, telephone lines or cellular data link. The CBM administrator controls each CS, and can remotely, using the CCU, switch each CS on or off, by commanding the individual controller units. Each CS can accordingly be placed in a different geographic area, near different base stations, enabling the CBM administrator to control which base station will broadcast the data, and therefore which EUTs will receive the data.

A further embodiment of the present invention enables the CBM administrator to operate a plurality of CSs simultaneously, by registering various CS units to various cellular networks. This is required because there can be only one user of each phone number on a given network that is participating in a call (in some networks a user can have two cell phones, one in his/her car and the other a handheld unit, but once a call is answered on either one, it will continue on that one without the possibility of having both phones in a conversation with the network at the same time). Of course, the CS units will be issued with different phone numbers from each network, and will therefore be applicable for different EUTs, however this may be useful when trying to cover a vast geographical zone with the same broadcast data. For example, if the CBM administrator wanted to send the same data to EUTs in NYC and in L.A. at the same time, s/he would have CS units registered to the different cellular networks in L.A. and in NYC, and distribute the appropriate EUT in those areas simultaneously, so that the EUTs in NYC match the phone number and parameter data of the CSs in NYC, and the EUTs in L.A. match the phone number and parameter data of the CSs in L.A. If we then call both a CS in NYC and a CS in L.A. at the same time, we would be able to transfer the same data to the EUTs in both cities simultaneously. The same holds for any other city or area, as long as the CBM administrator does not more than one CS of the same network at the same time.

According to an additional embodiment of the present invention, the EUT units are also provided with an identification code, so that when an EUT receives a data package, it first decides if it should display it or not, by comparing the message code with it's own identification code. For example, all PDA type EUTs may be given an identification code "X", while all kitchen appliances may be given a "Y" identification code. Commercial data targeted specifically for PDA type devices can be configured to be sent to "X" coded EUTs, and therefore this data will only be displayed by devices with "X" identification codes. Similarly, commercial data targeted specifically to kitchen type appliances can be configured to be sent to "Y" coded EUTs, thereby enabling targeted advertisements. The CBM administrator can therefore control not only the geographical area of the data recipients, but the type of the EUT units. This is important because not all EUT are designed the same (some display text, some graphics etc.), and since there can be different kinds of EUT in the same geographical area, each EUT needs to know which data is meant for it.

In addition, these identification codes can similarly be provided for user types, such that men and women, people of different nationalities or specific supermarket shoppers, for example, may be given different codes. In this way the CBM administrator can send data to specific user types. The combination of geographical area and user type controls, for example, can enable the CBM administrator to send commercial data to all supermarket clients when in the vicinity of the supermarket at a specific time. According to this embodiment, private CBMs can be enabled, wherein a customer may manage a single area CBM, using one CS unit (which does not require a control component), one cellular transmission base station, a CCU and a plurality of EUT units. In this embodiment, the CBM administrator can simply initiate calls to the CS and transmit data to the CS and simultaneously to all the EUT units in the cell surrounding the transmission base station. There is no need to control the CS, which may consequently be a regular cellular telephone that is connected to an electric charger so as to be permanently operational.

The principles and operation of the system and a method according to the present invention may be better understood with reference to the drawings and the accompanying description, it being understood that these drawings are given for illustrative purposes only and are not meant to be limiting, wherein:

The CBM, in addition to requiring the existing cellular infrastructure, contains three major components, as can be seen in FIG. 1:

1. End user terminals (EUT) specially designed to receive, process, present and transmit commercial or other data.
2. CS (Cell Stimulator) units, such as remote controllable cellular phones, which are placed in close proximity to cellular broadcasting facilities (base stations), are subscribed to a cellular service vendor, and are able to be controlled remotely by the Central Control Unit of the CBM.
3. The Central Control Unit (CCU) is the central control unit of the CBM. It remotely controls the operation of the CS units and the management of the CBM.

The End User Terminal (EUT)

The basic EUT is any type of communications and/or computing device that is fitted with the necessary components to enable users to receive, access, and present (display) data in a cellular network. Such devices are designed for use by the system subscribers, in order to intercept broadcast data. The devices have two major components:

1. A cellular receiver, which is designed to receive digital data via the cellular network.
2. A computer processor and a LCD or other display unit, for processing received data and displaying the data for the user. Alternatively, a loudspeaker or headphones, for example, may be provided for presenting audio type data.

The cellular receiver of the EUT operates as a listening device only. As described above, it is pre-programmed with the same cellular ID data and parameters as the CS. Whenever a 'conversation' is made between the cellular base station (cell) and the CS, the EUT, which is within the same cell coverage zone, receives all data that is transmitted to the CS. The computer processor is capable of processing all data received, and displaying it on the display. The data that is being broadcast via the CS has a predefined protocol and the computer processor in the EUT is programmed with the same protocol, so it can easily process the data and follow the instructions within the data. Any data encryption method can be used for the data communications.

A typical implementation of the CBM system, according to the present invention, is in the scenario where a corporation provides subscribers with free or subsidized consumer devices (such as a PDAs), in return for subscribers' willingness to accept commercial advertising on the devices. These devices are configured to be able to receive and view data in a cellular network, at all times, such that data is continually broadcast from the nearest cellular broadcasting facility to the particular device. Alternatively, the devices may be configured to receive transmitted data when the user (subscriber) is actively using the device, thereby assuring the advertisers that the subscriber is viewing the advertising data.

The CS (Cell Stimulator)

The CS is a communication device, such as a commercial cellular phone, together with a specially designed control unit that enables an administrator to remotely operate or shut down the communication unit of the device. The communication device can be either based on a commercial cell phone or even some communication circuits that comprise the equivalent of the communication part of a commercial cell phone (like a cell phone but without all the unnecessary parts like the display, keypad, etc.).

The control unit is comprised of a micro-controller, which is connected to the CBM Central Control Unit (CCU) via a wireline, satellite, Internet, cellular or any type of communication link that can enable the passing of commands from the CCU to the control unit. It can be remotely operated by the CBM administrator and be given instructions, such as when to operate (when the CBM operator wishes to transmit data to the EUTs in the vicinity of that particular CS) and when to shut down (cease operating). In the case of a cell phone based CS, the micro-controller is connected either to the power switch of the cell phone, or internally to the cell phone circuits, and is capable of turning the cell phone on and off, or changing its operation mode to either "standby", "off" or any other mode in which determines the cellular base station's ability to initiate a conversation with that specific CS. All the CS communication units carry the same serial number (ESN) and cellular ID parameters, so that they can all be accessed using the same phone number, and given the relevant commands or instructions.

The CCU

The CCU is a central computer system that manages the CBM system. The CCU can:

i. run software applications for designing and editing content and campaigns (such as advertisements, promotions, coupons, alerts, data updates etc.);

ii. enable storage of content and relevant system and user data;

iii. enable distribution of data to one or more CSs, by remotely controlling the operation status of the CSs, and transmitting data to chosen CSs;

iv. provide analysis on campaign progress, generate usage statistics, analyze trends etc.

v. enable management of the system resources, such as adding new CSs, connecting to databases, providing security functions etc.

The CCU is comprised of:
i. an input device, such as keyboard, mouse, microphone etc., for entering data and commands into the system, and configuring the system;
ii. data processing hardware and software;
iii. an output device, such as a screen, loudspeaker etc., for presenting the user interface by which the CBM administrator manages the CBS system; and
iv. a data communications component, such as a modem, radio transmitter etc., for enabling the transmitting of commands and content to the CS units.

The CBM Method of Operation

The purpose of the CBM is to broadcast commercial, advertisement or other data over the existing cellular phone infrastructure, to be received by various end user terminals (EUT) within chosen geographical areas.

Using the Central Control Center (CCU), the operator of the CBM system can design, edit or otherwise manage the data (commercial advertisements or other messages) to be broadcast to CBM subscribers. The CCU enables remotely switching "on" or "off" the various CS units, thereby determining which cellular base stations broadcast data to the EUT's that are in the vicinity of the CS unit(s) at any given moment. The actual process of remotely controlling base stations is as follows:
i. Each CS is placed in the vicinity (anywhere within the "cell", but preferably in close proximity to the base station) of each cellular base station (cellular transmitter), such that the cellular phone of the CS unit is within a single cellular base station's coverage zone, or within a few coverage zones.
ii. The CCU, according to the basic functioning of the CBM, remotely switches off all but one CS unit, by commanding the control units in the relevant CSs to switch the communication unit on or off (or any other mode such as standby), so that the communication unit can either function or cease functioning. In the present case we can assume, for the sake of simplicity, that only one CS has been placed in operating mode.
iii. A call is subsequently made from the CCU to the CSs in the CBM system, using a phone number that is equal for all CS units. The transmitted call is received by all the base stations in the cellular network. The base stations all search for the relevant cellular device that was communicated to by the CCU, and since only one CS is operational, a communication session is initiated between the CCU and the functional CS. The relevant data is sent to the functional CS within the communications session. Since all the EUTs in the relevant cell are functionally connected to the base station by RF waves, they all receive the data sent to the CS, and display the data accordingly. In this way, the CBM administrator, using the CCU, controls the transmission of data through each cell (from the base station), on an individual basis, enabling geographically targeted broadcasts of data.

For example: if an area contains 5 different cells, a CS unit is placed next to each cellular base station, such that each cellular base station can be remotely controlled. In this example, each CS will be given a name, 1 through 5. The CCU is then able to command the CS units 1 through 4 to switch off, such that CS number 5 is the only one that is switched on. A call is then placed (over a regular wireline phone or cellular phone line) to CS number 5 (all CS units carry the same ID parameters, and thus the same phone number), by which the CCU turns on the cellular phone unit (CS number 5). Once the CS is operational, it communicates with the CCU via the adjacent cellular base station (connected over RF waves to CS number 5). This communication can include transmitting any type of data from the CCU (or any other communication source) to the CS. This call is typically made from the CCU in order to enable design, production, storage, distribution and management of content within the CBM. Every functioning EUT which is located within the cellular base station number 5 coverage zone will receive all the information transmitted to the CS, process it, and display it.

Alternate Embodiments

Several other embodiments are contemplated by the inventors:

1. An additional embodiment of the present invention is provided that enables the real time management of product information (such as price labels) in a Point of Sale (such as each branch of a supermarket chain). In this embodiment, EUT units can function as product information or price tag displays. CSs are placed in the vicinity of cellular base stations that serve cells in which the various POS's are found. The supermarket chain itself may have a CCU, by means of which it can control data being sent to all its product displays, at any of the supermarket's branches. When the supermarket network operates it's own CCU it is in effect a corporate CBM system. The corporate CBM administrator can update the product displays (along with any other data that the display displays such as updated prices, product descriptions, availability etc.) from the supermarket's CCU. A typical display update for one branch only, for example, is as follows:
i. a call is made from the CCU to a particular (functional) CS, which is connected (by radio frequency waves) to the cellular base station that serves the area of the elected supermarket. This call makes the CS operational.
ii. a communication session is established with the CS, following which the relevant data is sent to the CS. This data, which is communicated between the CCU and the CS, via the relevant cellular base station, is simultaneously transmitted to all the EUTs in the cell being transmitted to by the cellular bases station. In this example, the data is displayed on all the price tags of the elected supermarket.

An alternative application of the CBM is to have EUTs distributed to a Point of Sale's (POS) customers, to be used as an information source for these customers. This EUT can subsequently be used to provide customers with price updates, price comparisons, sale alerts, coupons and other promotional data.

3. In an alternative embodiment, the CBM can be used as a paging system. EUTs (in the form of paging type device) can be distributed to employees of a certain firm, for example doctors in a hospital, each one with a different code identifying a particular employee. A CCU can be placed within the firm or the hospital. When a call is made between the CCU and a nearby CS, all the pager units (which are in fact EUTs) will receive the data in the normal way, but the single pager which will be identified with a relevant code within the data sent, will display the data. An example of a typical paging system is as follows:

In this example there are 5 doctors in a hospital. The hospital is provided with a CS that is placed somewhere in the hospital, and each doctor is issued a EUT that has the same phone number and system parameters as the hospital's CS. However, each EUT has an additional identification number, in this example 1 to 5. The hospital also has a CCU from which it can contact the CS. Once a connection is made between the CCU and the CS over a cellular call, a close base station is actually connected by RF waves to the CS, and all the EUTs receive all data transmitted from the CCU to the CS. The hospital's CCU then sends a string of data that has five different messages to each a number. Each EUT receives all 5 messages but displays only the one that is relevant to it, according to the identifying number 1 to 5. In this way a simple yet functional local paging system is provided. In the case where only one area requires service, only one CS is required, and this CS therefore does not require a control unit for being remotely operated.

4. Various alternative embodiments of the present invention are conceivable when incorporating usage of various cellular enabled devices, objects and appliances. Examples of some entities that are able to be receivers of cellular based broadcast data are: hand held computers and diaries; wearable computers, smart phones, electronic clocks; home inventory management units; air condition remote control units; universal or other remote controls; car information displays (such as road computers, navigation GPS receivers, news and traffic displays); any home entertainment devices that have a small LCD control panel on which the broadcast data can be displayed (such as a television, DVD, stereo system, home entertainment system); any other home appliances (such as microwave ovens, refrigerators, etc.); musical instruments (such as an electronic piano); any commercial advertisement display (such as an electronic price display, electronic advertisement billboards, electronic game machines) etc.; parking meters; electronic bus and train displays; street-side billboards; clip on diaries for cellular phones and paging units (beeper/pager).

The foregoing description of the embodiments of the invention has been presented for the purposes of illustration and description. It is not intended to be exhaustive or to limit the invention to the precise form disclosed. It should be appreciated that many modifications and variations are possible in light of the above teaching. It is intended that the scope of the invention be limited not by this detailed description, but rather by the claims appended hereto.

What is claimed is:

1. A system for broadcasting data and displaying the data, the system using a cellular communications network, the system comprising:
   a cellular base station and a cellular telephone of the cellular communications network, the cellular telephone being configured as a cellular stimulation (CS) unit; wherein the cellular stimulation (CS) unit has a transmitter and a receiver for communicating with said cellular base station, and during said communicating said CS unit receives radio communications only from said cellular base station, wherein said CS unit has a cellular identification within the cellular communications network, wherein said cellular base station communicates using a handshake procedure with said CS unit;
   a plurality of End User Terminals (EUTs), each said EUT having an EUT receiver which only receives said radio communications from said cellular base station,—said EUTs having the same cellular identification in said cellular network as said CS unit for receiving said radio communications wherein each said EUT has no transmitter for transmitting to the cellular base station; and
   a Central Control Unit (CCU) operatively attached to but not part of the cellular communications network, wherein said CCU calls said CS unit thereby initiating said radio communications, whereupon said cellular base station performs said handshake procedure solely with said CS unit and not with said EUTs, wherein said handshake procedure is received by said EUT receivers, whereupon completing said handshake procedure, said CCU transmits the data to said CS unit, and thereby broadcasts the data to said EUTs, wherein the data are received as said radio communications by said End User Terminals for displaying at least a portion of the data at said EUTs.

2. The system of claim 1, wherein said EUTs are selected from at least one of the group of device types consisting of hand held calendars, hand held phone books, electronic clocks, home inventory management units, air condition remote control units, remote controls, car information displays, home entertainment devices, home appliances, kitchen appliances, musical instruments, commercial advertisement displays, parking meters, electronic bus and train displays, billboards, clip on diaries for cellular phones and paging units.

3. The system of claim 1, wherein said CS unit further comprises a control unit for enabling remote operation of said CS unit.

4. The system of claim 1, wherein said CCU further comprises a control component for remotely operating said CS unit.

5. The system of claim 4, wherein said control component enables an operator of said CCU to target communication of data to said cellular stimulation unit, thereby communicating said data to said End User Terminals in the proximity of said cellular stimulation unit.

6. The system of claim 1, wherein said CCU further comprises a communication component for initiating communication with said CS unit.

7. The system of claim 1, wherein said CCU further comprises application software for designing data to be sent to said EUTs.

8. The system of claim 1, wherein said CCU further comprises a database component for storing system data.

9. A method for broadcasting data and displaying the data at a plurality of points of sale using a cellular communications network including a cellular base station and a cellular telephone of the cellular communications network, method comprising the steps of:
   configuring the cellular telephone as a cellular stimulation (CS) unit; wherein the cellular stimulation (CS) unit has a transmitter and a receiver for communicating with said cellular base station, and during said communicating said CS unit receives radio communications only from said cellular base station, wherein said CS unit has a cellular identification within the cellular communications network, wherein said cellular base station communicates uses a handshake procedure with said CS unit;
   providing a plurality of End User Terminals (EUTs), each said EUT having an EUT receiver which only receives said radio communications from said cellular base station, said EUTs having the same cellular identification in said cellular network as said CS unit for receiving said radio communications, wherein each said EUT has no transmitter for transmitting to the cellular base station;
   calling said CS unit from a Central Control Unit (CCU), wherein said CCU is operatively attached to but not part of the cellular communications network, whereby said calling initiates said radio communications, whereupon said cellular base station performs said handshake procedure solely with said CS unit and not with said EUTs, wherein said handshake procedure is received by said EUT receivers;

upon completing said handshake procedure, transmitting by said CCU the data to said CS unit, and thereby broadcasting the data to said EUTs, wherein the data as said radio communications are received by said End User Terminals; and displaying at least a portion of the data in the points of sale respectively attached to said EUTs.

10. The method of claim 9, wherein said calling said CS unit further comprises the step of remotely initiating operation of said CS unit, thereby enabling said radio communications with said CS unit.

11. The method of claim 9, wherein said calling enables said radio communications with a plurality of said CS units, said plurality of CS units being active simultaneously in separate cellular networks.

12. A method for broadcasting data to a plurality of subscribers, using a cellular communications network including a cellular base station and a cellular telephone of the cellular communications network, the method comprising the steps of:

configuring the cellular telephone as a cellular stimulation (CS) unit; wherein the cellular stimulation (CS) unit has a transmitter and a receiver for communicating with said cellular base station, and during said communicating said CS unit receives radio communications only from said cellular base station, wherein said CS unit has a cellular identification within the cellular communications network, wherein said cellular base station communicates uses a handshake procedure with said CS unit;

providing a plurality of End User Terminal EUTs to the subscribers, each said EUT having an EUT receiver which only receives said radio communications from said cellular base station, said EUTs having the same cellular identification in said cellular network as said CS unit for receiving said radio communications, wherein each said EUT has no transmitter for transmitting to the cellular base station;

calling said CS unit from a Central Control Unit (CCU), wherein said CCU is operatively attached to but not part of the cellular communications network, whereby said calling initiates said radio communication whereupon said cellular base station performs said handshake procedure solely with said CS unit and not with said EUTs, wherein said handshake procedure is received by said EUT receivers;

upon completing said handshake procedure, transmitting by said CCU the data to said CS unit, and thereby broadcasting the data to said EUTs, wherein the data as said radio communications are received by said End User Terminals; and displaying at least a portion of said data by said EUTs to said subscribers.

13. A method for broadcasting data to a plurality of users, wherein the users are identified by a plurality of user types, the method using a cellular communications network including a cellular base station and a cellular telephone of the cellular communications network, the method comprising the steps of:

configuring the cellular telephone as a cellular stimulation (CS) unit; wherein the cellular stimulation (CS) unit has a transmitter and a receiver for communicating with said cellular base station, and during said communicating said CS unit receives radio communications only from said cellular base station, wherein said CS unit has a cellular identification within the cellular communications network, wherein said cellular base station communicates uses a handshake procedure with said CS unit;

providing a plurality of End User Terminal (EUT) to the users, each said EUT having an EUT receiver which only receives said radio communications from said cellular base station, said EUTs having the same cellular identification in said cellular network as said CS unit for receiving said radio communications, wherein each said EUT has no transmitter for transmitting to the cellular base station; wherein said EUTs are further identified by one of the user types;

calling said CS unit from a Central Control Unit (CCU), wherein said CCU is operatively attached to a Central Control Unit (CCU) operatively attached to but not part of the cellular communications network, whereby said calling initiates said radio communications, whereupon said cellular base station performs said handshake procedure solely with said CS unit and not with said EUTs, wherein said handshake procedure is received by said EUT receivers;

upon completing said handshake procedure, transmitting by said CCU the data to said CS unit, and thereby broadcasting the data to said EUTs, wherein the data as said radio communications are received by said End User Terminals; and displaying at least a portion of said data by said EUTs to the users wherein said portion is based on said one user type.

14. A method for updating product data in real time at a plurality of points of sale, the method using a cellular communications network including a cellular base station and a cellular telephone, the method comprising the steps of:

configuring the cellular telephone as a cellular stimulation (CS) unit; wherein the cellular stimulation (CS) unit has a transmitter and a receiver for communicating with said cellular base station, and during said communicating said CS unit receives radio communications only from said cellular base station, wherein said CS unit has a cellular identification within the cellular communications network, wherein said cellular base station communicates uses a handshake procedure with said CS unit;

operatively attaching at least one End User Terminal (EUT) respectively to at least one of the points-of-sale, said at least one EUT having an EUT receiver which only receives said radio communications from said cellular base station said at least one EUT having the same cellular identification in said cellular network as said CS unit for receiving said radio communications, wherein said at least one EUT has no transmitter for transmitting to the cellular base station; wherein said at least one EUT is further identified by an identification code corresponding to the at least one point-of-sale;

calling said CS unit from a Central Control Unit (CCU), wherein said CCU is operatively attached to but not art of the cellular communications network, whereby said calling initiates said radio communications, whereupon said cellular base station performs said handshake procedure solely with said CS unit and not with said EUTs, wherein said handshake procedure is received by said EUT receivers;

upon completing said handshake procedure, transmitting by said CCU the data to said CS unit, and thereby broadcasting the data to said at least one EUT, wherein the data as said radio communication are received by said at least one End User Terminal; and displaying at least a portion of the product data by said at least one EUT at said at least one point-of-sale, said onion based on said identification code.

15. A method for providing a paging service to a plurality of users, using a cellular communications network including a cellular base station and a cellular telephone, the method comprising the steps of:

configuring the cellular telephone as a cellular stimulation (CS) unit; wherein the cellular stimulation (CS) unit has a transmitter and a receiver for communicating with said cellular base station, and during said communicating said CS unit receives radio communications only from said cellular base station, wherein said CS unit has a cellular identification within the cellular communications network, wherein said cellular base station communicates uses a handshake procedure with said CS unit;

providing at least one End User Terminal (EUT) respectively to at least one of the users, said at least one EUT having an EUT receiver which only receives said radio communications from said cellular base station, said at least one EUT having the same cellular identification in said cellular network as said CS unit for receiving said radio communications, wherein said at least one EUT has no transmitter for transmitting to the cellular base station; wherein said at least one EUT is further identified by an identification code corresponding to the at least one user;

calling said CS unit from a Central Control Unit (CCU), wherein said CCU is operatively attached to but not art of the cellular communications network, whereby said calling initiates said radio communications, whereupon said cellular base station performs said handshake procedure solely with said CS unit and not with said EUTs, wherein said handshake procedure is received by said EUT receivers;

upon completing said handshake procedure transmitting by said CCU the data to said CS unit, and thereby broadcasting the data to said at least one EUT, wherein the data as said radio communications are received by said at least one End User Terminal; and displaying at least a portion of said data by said at least one EUT, wherein said portion is based on said at least one identification code corresponding to the at least one user.

* * * * *

UNITED STATES PATENT AND TRADEMARK OFFICE
CERTIFICATE OF CORRECTION

PATENT NO. : 7,324,810 B2  
APPLICATION NO. : 10/131226  
DATED : January 29, 2008  
INVENTOR(S) : Zvika Nave and Ziv Nave Page 1 of 1

It is certified that error appears in the above-identified patent and that said Letters Patent is hereby corrected as shown below:

Claim 14, column 14 should be corrected as follows:

Line 61: change "art" to --part--

Claim 14, column 15 should be corrected as follows:

Line 8: change "onion" to --portion--

Signed and Sealed this

Sixth Day of May, 2008

JON W. DUDAS  
*Director of the United States Patent and Trademark Office*